United States Patent
Nomura et al.

(10) Patent No.: US 10,060,518 B2
(45) Date of Patent: Aug. 28, 2018

(54) RACK BAR AND RACK BAR TEETH FORMING DIE

(71) Applicant: NETUREN CO., LTD., Tokyo (JP)

(72) Inventors: Makoto Nomura, Tokyo (JP); Takashi Yamawaki, Tokyo (JP); Ryosuke Suzuki, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 391 days.

(21) Appl. No.: 15/067,788

(22) Filed: Mar. 11, 2016

(65) Prior Publication Data
US 2016/0195181 A1 Jul. 7, 2016

Related U.S. Application Data

(62) Division of application No. 13/923,022, filed on Jun. 20, 2013, now Pat. No. 9,316,294.

(30) Foreign Application Priority Data

Jun. 21, 2012 (JP) .................................. 2012-139551

(51) Int. Cl.
*F16H 55/26* (2006.01)
*F16H 19/04* (2006.01)
(Continued)

(52) U.S. Cl.
CPC .............. *F16H 55/26* (2013.01); *B21J 13/02* (2013.01); *B62D 3/126* (2013.01); *F16H 19/04* (2013.01);
(Continued)

(58) Field of Classification Search
CPC .......... F16H 55/26; F16H 19/04; F16H 55/16; B21J 13/02; B62D 3/126
See application file for complete search history.

(56) References Cited

U.S. PATENT DOCUMENTS 1,632,923 A 6/1927 Sanford
2,682,760 A 7/1954 Shenk
(Continued)

FOREIGN PATENT DOCUMENTS

JP S55-140147 10/1980
JP 2002-086243 3/2002
(Continued)

OTHER PUBLICATIONS

Notification of Reasons for Refusal dated Oct. 27, 2015 in corresponding Japanese Application No. 2012-139551 (with English translation).

*Primary Examiner* — David M Fenstermacher
(74) *Attorney, Agent, or Firm* — Wenderoth, Lind & Ponack, L.L.P.

(57) ABSTRACT

A rack bar includes a shaft portion and a rack toothed portion provided on the shaft portion. The rack toothed portion includes a plurality of rack teeth provided side by side in an axial direction of the shaft portion to mesh with a pinion gear. Each of the rack teeth includes a tooth tip portion, a contact face arranged obliquely relative to the axial direction and configured to contact the pinion gear, and a rounded corner portion between the tooth tip portion and the contact face. A first radius defining a central area of the rounded corner portion with respect to a tooth width direction is larger than a second radius defining another area of the rounded corner portion other than the central area.

2 Claims, 5 Drawing Sheets

(51) Int. Cl.
  *F16H 55/16* (2006.01)
  *B62D 3/12* (2006.01)
  *B21J 13/02* (2006.01)
  *B21K 1/76* (2006.01)

(52) U.S. Cl.
  CPC .............. *F16H 55/16* (2013.01); *B21K 1/768* (2013.01); *Y10T 74/1967* (2015.01)

(56) References Cited

U.S. PATENT DOCUMENTS

| | | | | |
|---|---|---|---|---|
| 4,598,451 | A * | 7/1986 | Ohki | B21K 1/767 29/893.3 |
| 4,641,406 | A * | 2/1987 | Rogers | B21K 1/767 24/422 |
| 5,069,080 | A * | 12/1991 | Simon | B21C 23/14 74/422 |
| 6,289,710 | B1 * | 9/2001 | Ozeki | B21K 1/767 72/356 |
| 6,317,979 | B1 * | 11/2001 | Yamawaki | B21K 1/767 29/893.34 |
| 6,470,993 | B1 | 10/2002 | Matsuda | |
| 6,588,293 | B2 * | 7/2003 | Tsubouchi | B21K 1/767 74/422 |
| 6,763,739 | B2 * | 7/2004 | Tsubouchi | B21K 1/767 74/422 |
| 7,654,165 | B2 * | 2/2010 | Roeske | B21J 5/12 29/893.34 |
| 7,921,745 | B2 | 4/2011 | Takumori | |
| 7,950,153 | B2 * | 5/2011 | Dohmann | B21J 5/12 29/893.34 |
| 7,992,462 | B2 | 8/2011 | Takumori | |
| 8,578,807 | B2 | 11/2013 | Kunz | |
| 8,869,582 | B2 * | 10/2014 | Cornish | B21J 5/12 72/353.2 |
| 9,199,662 | B2 * | 12/2015 | Ueno | B62D 3/12 |
| 9,316,294 | B2 * | 4/2016 | Nomura | B62D 3/126 |
| 9,328,815 | B2 * | 5/2016 | Nomura | F16H 55/26 |
| 9,492,897 | B2 * | 11/2016 | Oumi | B21K 1/767 |
| 2007/0017314 | A1 | 1/2007 | Konishi | |
| 2013/0091970 | A1 | 4/2013 | O-oka et al. | |

FOREIGN PATENT DOCUMENTS

| | | |
|---|---|---|
| JP | 2005-016646 | 1/2005 |
| JP | 2007-253190 | 10/2007 |
| JP | 2009-264451 | 11/2009 |
| JP | 2009-280199 | 12/2009 |

* cited by examiner

RACK BAR AND RACK BAR TEETH FORMING DIE

CROSS-REFERENCE TO RELATED APPLICATION

The present application claims priority from Japanese Patent Application No. 2012-139551 filed on Jun. 21, 2012, the entire content of which is incorporated herein by reference.

FIELD OF INVENTION

The present invention relates to a rack bar which is used in a rack and pinion gear which is used in turn in a power steering system of a motor vehicle and a rack teeth forming die, and more particularly to a technique which realizes an improvement in steering force transmission efficiency of a rack bar and an extension of life of a rack teeth forming die.

BACKGROUND

A steering system for steering a vehicle includes a pinion gear on the side of a steering shaft and a rack bar on which rack teeth are formed on the side of tie-rods which connect left and right front road wheels. Then, rotational steering force transmitted from a steering wheel is converted to a horizontal lateral force by a steering gear box, and the horizontal lateral force is then transmitted to the road wheels by way of the pinion gear and the rack teeth, whereby a rotational force around king pins is applied to the road wheels (see, e.g., JP2007-253190A).

On the rack bar, the steering force transmitted from the steering wheel is transmitted from contact faces of the pinion gear and the rack teeth. Consequently, the larger the contact faces are, the more efficiently the steering force can be transmitted.

In a process of producing such a rack bar, there is known a method for increasing the strength of a rack bar to be produced by attaining a uniform flow of a metal material into recess portions in a die during a press rolling of the material (see, e.g., JP2002-86243A).

The rack bar described above has the following problem. Namely, as a method for forming rack teeth, there is known a method for press forging a pipe member 310 from an interior 311 thereof, as shown in FIG. 7. In this method, the press forging is carried out by employing mandrels 340 having a tapered projection on an upper surface side as a mandrel 340. When a mandrel 340 is press fitted into the pipe member 310, a material of an upper surface 312 of the pipe member 310 is caused to project into recess portions in a teeth forming die 350 by the projection on the mandrel 340. Thereafter, the mandrel 340 is replaced with a mandrel 340 having a larger projection to be press fitted into the pipe member 310. This process is repeated, whereby a rack toothed portion 320 is formed on the upper surface 312 of the pipe member 310. In this process, the material of the upper surface 312 is rolled and forged, and therefore, large stress is produced particularly at portions of the recess portions of the teeth forming die 350 which transfer a profile of central portions of the rack toothed portion 320 with respect to a tooth width direction. Because of this, when the number of times of forming a rack toothed portion 320 is increased, minute cracks are produced in the teeth forming die 350. These cracks are produced particularly in the central portions where the large stress is produced. Then, the material enters the cracks to produce burs. As this occurs, since a rack bar produced from the pipe member 310 becomes a defective product, the teeth forming die 350 needs to be replaced with another which is free from such cracks.

FIG. 8 is a perspective view showing one example of general rack teeth in an enlarged fashion, FIG. 9 is a perspective view showing another example of general rack teeth in an enlarged fashion, and FIG. 10 is an explanatory diagram illustrating a comparison of sectional shapes of the rack teeth shown in FIGS. 8 and 9.

In FIG. 8, reference numeral 321 denotes one example of general rack teeth, 322 denotes a tooth tip portion of the rack tooth 321, 323 denotes a tooth tip rounded corner portion, 324 denotes a face or contact face, 325 denotes a tooth bottom rounded corner portion, and 326 denotes a tooth bottom portion. In addition, in FIG. 10, S1 denotes a sectional shape of the rack tooth 321 shown in FIG. 8, L1 denotes a face length (a straight length) of the contact face 324, and R1 denotes a radius defining the tooth tip rounded corner portion 323. The tooth tip portion 322 and the contact face 324 connects to each other along an R shape of the tooth tip rounded corner portion 323, and the contact face 324 and the tooth bottom portion 326 connect to each other along an R shape of the tooth bottom rounded corner portion 325. These connections by way of the R shapes result from forming the rack teeth 320 through forging and intended to increase the life of the teeth forming die.

As shown by S1 in FIG. 10, although when the radius R1 defining the tooth tip rounded corner portion 323 is large, the life of the teeth forming die can be extended, the straight length L1 becomes short. Since the contact face 324 is a portion where the steering force is transmitted directly from a face of each of teeth of the pinion gear, in case the straight length L1 is short, the area of the contact face 324 becomes small, and therefore, the durability and strength and the steering force transmission efficiency with the pinion gear of the rack tooth 321 become insufficient.

On the other hand, in FIG. 9, reference numeral 331 denotes another example of general rack teeth, 332 denotes a tooth tip portion of the rack tooth 331, 333 denotes a tooth tip rounded corner portion, 334 denotes a face or contact face, 335 denotes a tooth bottom rounded corner portion, and 336 denotes a tooth bottom portion. In addition, in FIG. 10, S2 denotes a sectional shape of the rack tooth 331 shown in FIG. 9, L2 denotes a face length (a straight length) of the contact face 334, and R2 denotes a radius defining the tooth tip rounded corner portion 333. The tooth tip portion 332 and the contact face 334 connects to each other along an R shape of the tooth tip rounded corner portion 333, and the contact face 334 and the tooth bottom portion 336 connect to each other along an R shape of the tooth bottom rounded corner portion 335.

As shown by S2 in FIG. 10, when the straight length L2 becomes long, the area of the contact face 334 becomes large, and therefore, the durability and strength and the steering force transmission efficiency with the pinion gear of the rack tooth 331 can be increased. On the other hand, when the straight length L2 becomes long, the radius R2 defining a rounded corner portion of the tooth tip becomes small, and the life of the teeth forming die becomes insufficient.

SUMMARY

It is an object of the invention to provide a rack bar having rack teeth whose contact faces are made large so as to have sufficient steering force transmission efficiency with a pinion gear as well as sufficient durability and strength, and a long-life rack teeth forming die for transferring the rack teeth on the rack bar.

According to an aspect of the present invention, a rack bar is provided. The rack bar is configured to mesh with a pinion gear. The rack bar includes a shaft portion and a rack toothed portion provided on the shaft portion. The rack toothed portion includes a plurality of rack teeth configured to mesh with the pinion gear. The rack teeth are provided side by side in an axial direction of the shaft portion. Each of the rack teeth includes a tooth tip portion, a contact face arranged obliquely relative to the axial direction and configured to contact the pinion gear, and a rounded corner portion between the tooth tip portion and the contact face. A first radius defining a central area of the rounded corner portion with respect to a tooth width direction is larger than a second radius defining another area of the rounded corner portion other than the central area.

According to the invention, a teeth forming die is provided. The teeth forming die is configured to form rack teeth of a rack bar to be meshed with a pinion gear. The teeth forming die includes a securing portion configured to be secured to an outside clamp case, and a rack teeth transfer portion provided on the securing portion. The rack teeth transfer portion includes a plurality of rack tooth transfer portions provided side by side in a line. Each of the rack tooth transfer portions is configured to transfer a profile of each rack tooth. Each of the rack tooth transfer portions includes a tooth bottom transfer portion configured to transfer a profile of a tooth bottom portion of the rack tooth, a tooth tip transfer portion configured to transfer a profile of a tooth tip portion of the rack tooth, a contact face transfer portion arranged obliquely relative to a direction of the line in which the rack tooth transfer portions are provided side by side and configured to transfer a profile of a contact face of the rack tooth to be brought into contact with the pinion gear, and a rounded corner portion between the tooth tip transfer portion and the contact face transfer portion. A first radius defining a central area of the rounded corner portion with respect to a tooth width direction is larger than a second radius defining another area of the rounded corner portion other than the central area.

DETAILED DESCRIPTION

Figure 1:
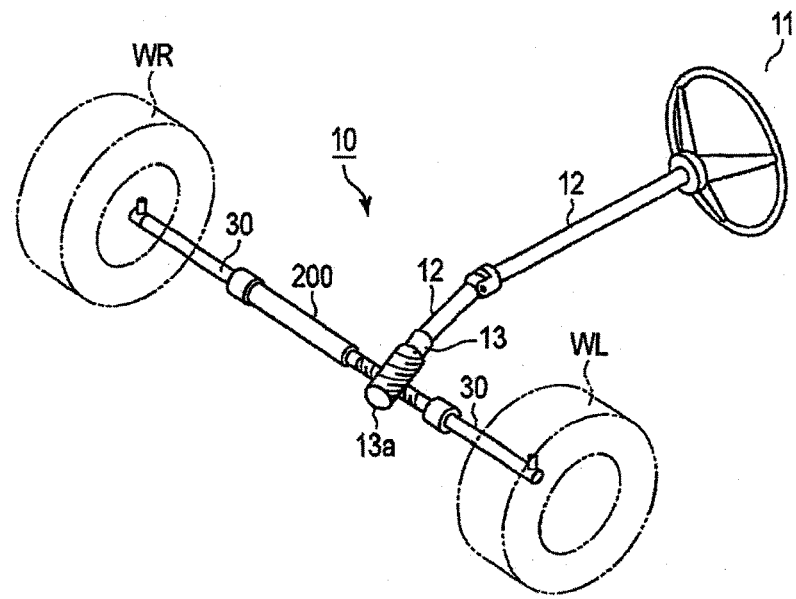
FIG. 1 is a perspective view of a steering system in which a rack bar according to an embodiment of the invention is incorporated.
Figure 2:
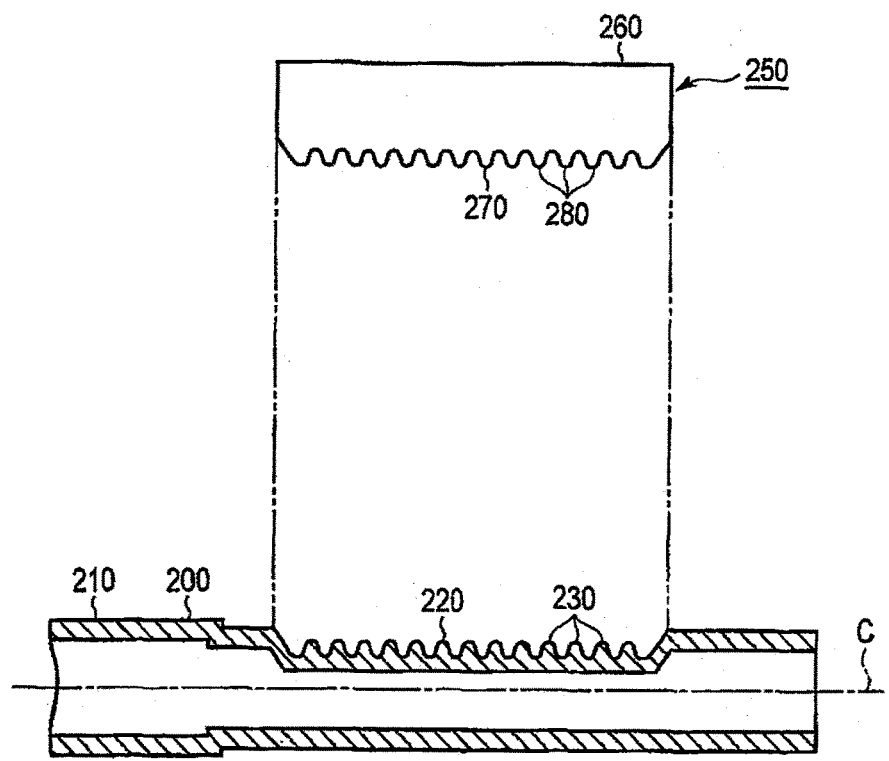
FIG. 2 is an explanatory diagram illustrating a section of the rack bar and a rack teeth forming die of the embodiment of the invention.
Figure 3:
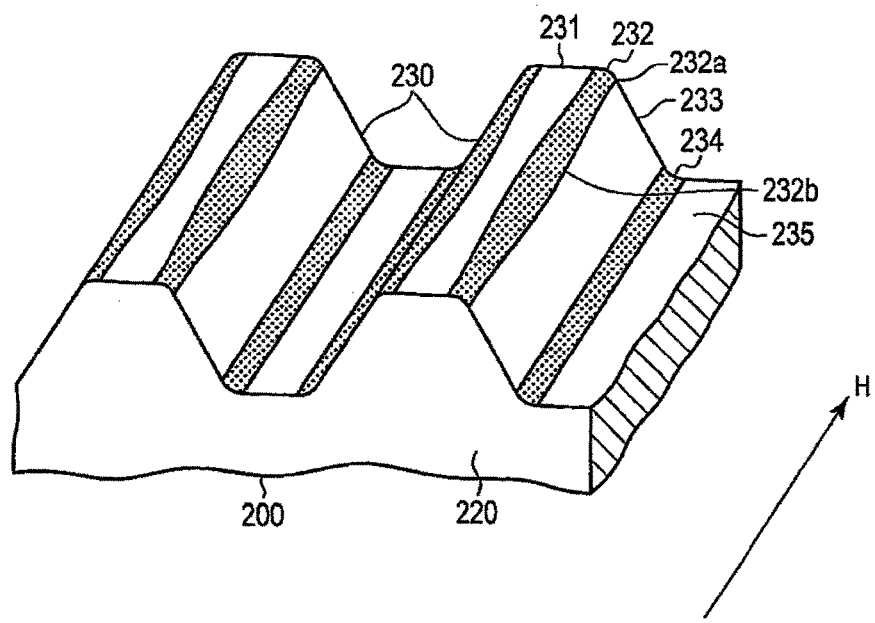
FIG. 3 is an enlarged perspective view of a portion of the rack bar in an enlarged fashion.
Figure 4:
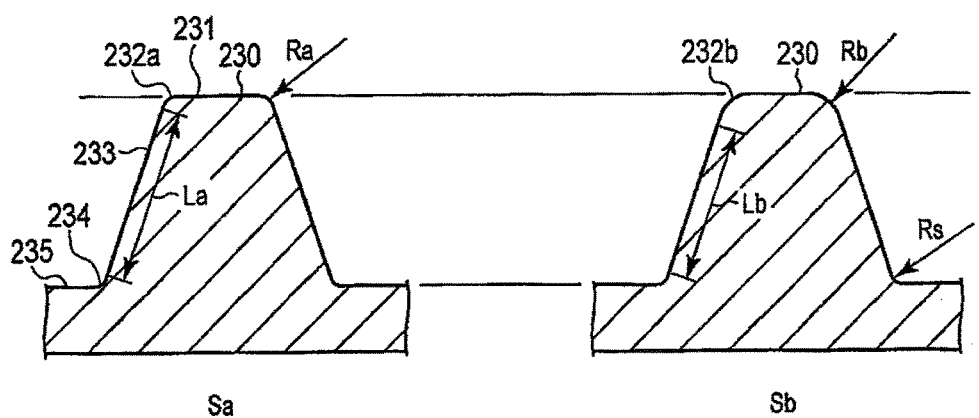
FIG. 4 is an explanatory diagram illustrating sectional shapes of different portions of a rack tooth of the rack bar in comparison.
Figure 5:
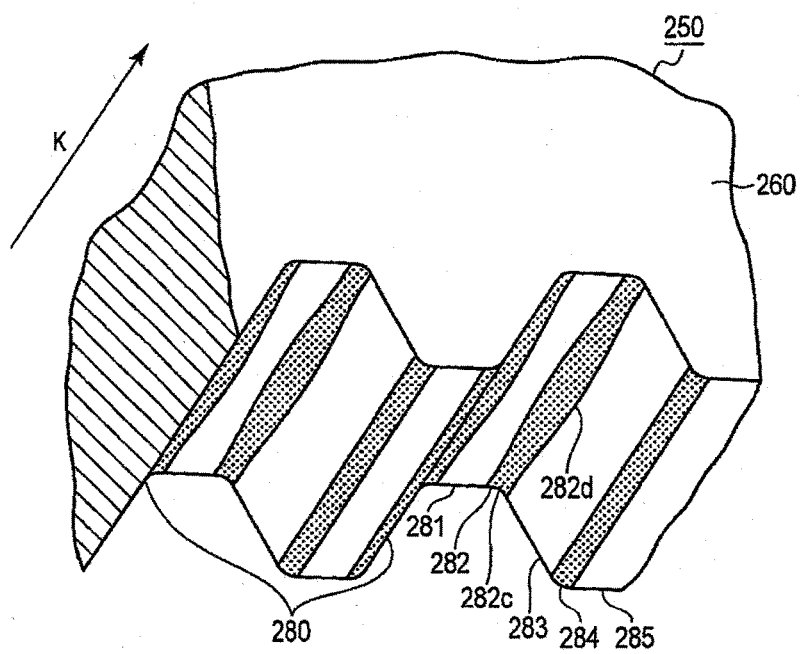
FIG. 5 is an enlarged perspective view of a portion of the rack teeth forming die.

FIG. 1 is a perspective view showing a steering system 10 in which a rack bar 200 according to an embodiment of the invention is incorporated, FIG. 2 is an explanatory diagram showing a section of the rack bar 200 and a front view of a teeth forming die 250 which transfers a profile of a rack toothed portion 220 of the rack bar 200, FIG. 3 is a perspective view showing rack teeth 230 of the rack bar 200 in an enlarged fashion, FIG. 4 is an explanatory diagram showing sectional shapes of different portions of the rack tooth 230 in comparison, and FIG. 5 is a partially cutaway perspective view showing rack tooth transfer portions 280 of the teeth forming die 250 in an enlarged fashion. In FIG. 2, C denotes an axis of the rack bar 200, and in FIG. 5, K denotes a tooth width direction of the teeth forming die 250.

As shown in FIG. 1, the steering system 10 includes a steering shaft 12 which connects to a steering wheel (a steering member) 11, a pinion shaft 13 that connects to the steering shaft 12 and which has a pinion gear 13a at a distal end thereof and a rack bar 200 which meshes with the pinion gear 13a. The rack bar 200 connects further to left and right front road wheels WR, WL via tie-rods 30, 30.

FIG. 2 shows the section of the rack bar 200 and a front view of a teeth forming die 250 which transfers a profile of a rack toothed portion 220 of the rack bar 200.

As shown in FIG. 2, the rack bar 200 includes a shaft portion 210 formed from a round hollow rod and the rack toothed portion 220 provided at the center of the shaft portion 210. The rack toothed portion 220 has a plurality of rack teeth 230 configured to mesh with the pinion gear 13 are provided side by side along the axis C of the rack bar 200. Contact faces 233 (contact areas) of the rack teeth are disposed obliquely relative to the axis C.

The teeth forming die 250 has a substantially rectangular parallelepiped shape and includes a securing portion 260 adapted to be secured to an outside clamp case and a rack toothed portion transfer portion 270 that is formed on one of surfaces of the securing portion 260 and which transfers a profile of the rack toothed portion 220. In the rack toothed portion transfer portion 270, a plurality of rack tooth transfer portions 280 are provided parallel along a longitudinal direction of the securing portion 260.

As shown in FIG. 3, the rack tooth 230 includes a tooth tip portion 231 having a flat planar shape at a distal end thereof, tooth tip rounded corner portions 232 defined by a radius R, contact faces 233 which are brought into contact with the pinion gear 13a to thereby transmit steering force, tooth bottom rounded corner portions 234 defined by Rs and a tooth bottom portion 235 which has a flat planar shape. The tooth tip rounded corner portions 232 are each positioned between the tooth tip portion 231 and the contact face 233, and the tooth bottom rounded corner portions 234 are each positioned between the contact face 233 and the tooth bottom portion 235.

FIG. 4 is an explanatory diagram showing sectional shapes of different portions of the rack tooth 230 in comparison. In FIG. 4, a cross section Sa of a portion of the rack tooth 230 near an end of the rack tooth 230 in a tooth width direction H of the rack tooth 230 is illustrated on the left, and a cross section Sb of a central portion of the rack tooth 230 with respect to the tooth width direction H of the rack tooth 230 is illustrated on the right. In addition, in FIG. 4, La denotes a face length of the contact face in Sa, Lb denotes a face length of the contact face in Sb, Ra denotes a radius defining a tooth tip rounded corner portion 232a in Sa, and Rb denotes a radius defining a tooth tip rounded corner portion 232b in Sb. As shown in FIG. 4, the radius Ra is formed smaller than the radius Rb. For example, a ratio of the radius Ra to the radius Rb is 1 to 1.1. By forming the radii in this way, a straight length La is formed larger than a straight length Lb. At least one of the radius Ra and the radius Rb may be different for each of the rack teeth 230.

FIG. 5 is a partially cutaway perspective view showing the rack tooth transfer portions 280 of the teeth forming die 250 in an enlarged fashion. The rack tooth transfer portion 280 includes a tooth tip transfer portion 281 having a flat planar shape and configured to transfer a profile of the tooth tip portion 231, a tooth tip rounded corner portion transfer portion 282 defined by the radius R and configured to transfer a profile of the tooth tip rounded corner portion 232, a contact face transfer portion 283 having a flat planar shape and configured to transfer a profile of the contact face 233, a tooth bottom rounded corner portion transfer portion 284 defined by a radius Rt and configured to transfer a profile of the tooth bottom rounded corner portion 234 and a tooth bottom transfer portion 285 having a flat planar shape and configured to transfer a profile of the tooth bottom portion 235. The tooth tip rounded corner portion transfer portion 282 is positioned between the tooth tip transfer portion 281 and the contact face transfer portion 283, and the tooth bottom rounded corner portion transfer portion 284 is positioned between the contact face transfer portion 283 and the tooth bottom transfer portion 285.

Figure 6:
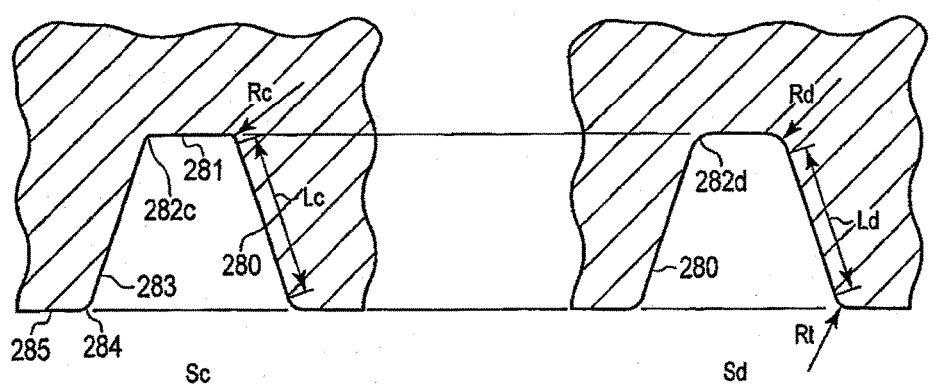
FIG. 6 is an explanatory diagram illustrating sectional shapes of different portions of a rack tooth transfer portion of the rack teeth forming die in comparison.
Figure 7:
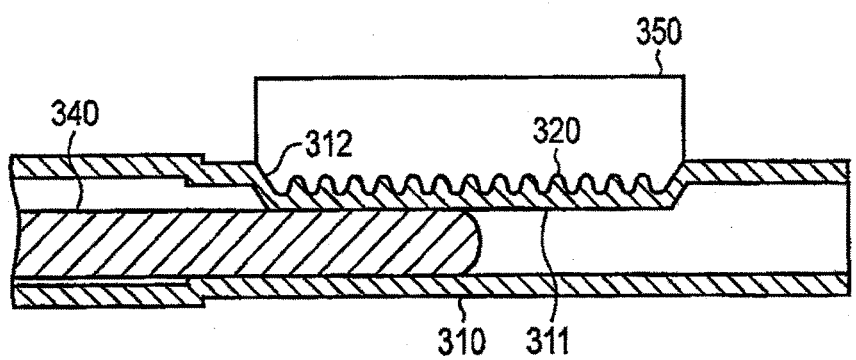
FIG. 7 is a partially cutaway front view of an example of a general rack bar producing system.
Figure 8:
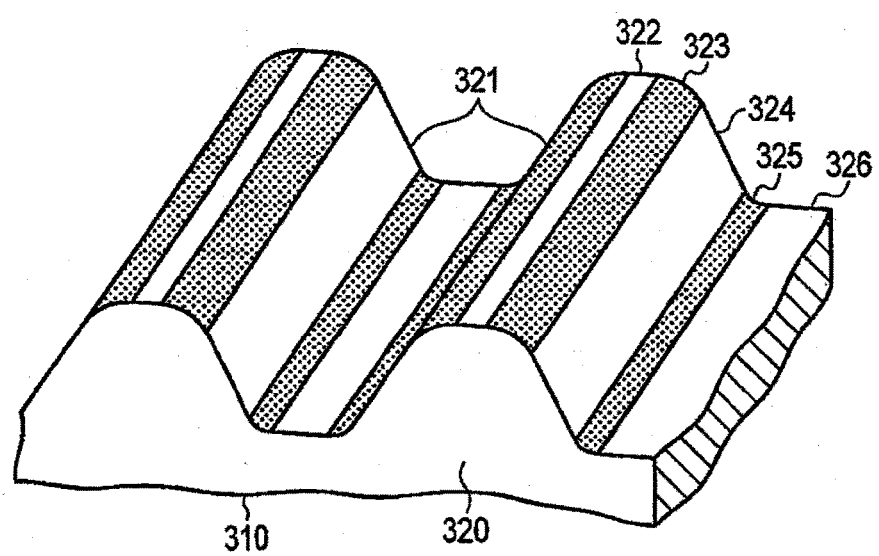
FIG. 8 is an enlarged perspective view of a first example of rack teeth of a general rack bar.
Figure 9:
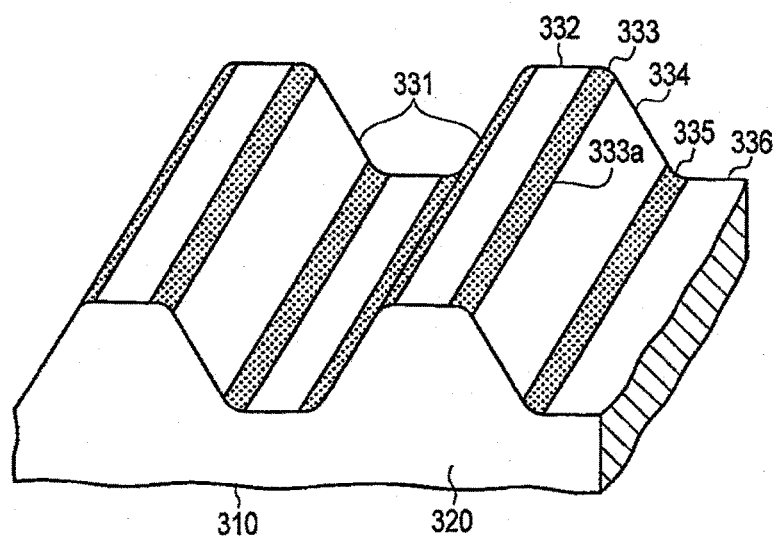
FIG. 9 is a perspective view of a second embodiment of rack teeth of a general rack bar.
Figure 10:
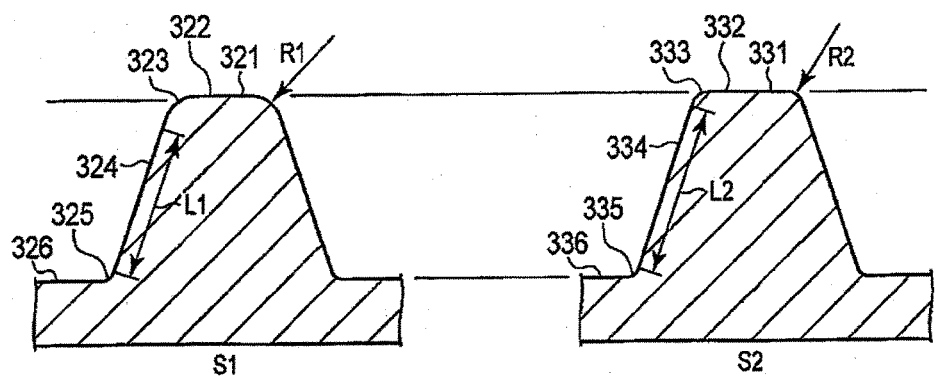
FIG. 10 is an explanatory diagram illustrating a profile of rounded corner portions at the top portions of the rack teeth of the general rack bars.

FIG. 6 is an explanatory diagram showing sectional shapes of different portions of the rack tooth transfer portion 280 in comparison. In FIG. 6, a cross section Sc of a portion of the rack tooth transfer portion 280 near an end of the of the rack tooth transfer portion 280 in a tooth width direction K of the teeth forming die 250 is illustrated on the left, and a cross section Sd of a central portion of the rack tooth transfer portion 280 with respect to the tooth width direction K of the rack tooth transfer portion 280 is illustrated on the right. In addition, in FIG. 6, Lc denotes a straight length of the contact face transfer portion 283 in Sc, Ld denotes a straight length of the contact face transfer portion 283 in Sd, Rc denotes a radius defining a tooth tip rounded corner portion transfer portion 282c in Sc, and Rd denotes a radius defining a tooth tip rounded corner portion transfer portion 282d in Sd. As shown in FIG. 6, the radius Rc is formed smaller than the radius Rd. For example, when the ratio of the radius Ra to the radius Rb is 1 to 1.1, a ratio of the radius Rc to the radius Rd is also 1 to 1.1. By forming the radii in this way, the straight length Lc is formed larger than the straight length ld. At least one of the radius Rc and the radius Rd may be different for each of the rack tooth transfer portions 280.

When the rack tooth transfer portion 280 is formed in this way, the radius Rd is formed large which defines the portion lying near the central portion 282d in the direction K of the tooth tip rounded corner portion transfer portion 282, thereby making it possible to extend the life of the teeth forming die 250. Additionally, in the rack bar 200 which is formed by the teeth forming die 250, the straight length L of the rack tooth portion 230 is formed into the short straight length Lb at the central portion in the tooth width direction and into the long straight length La at the end portion in the tooth width direction. By adopting this configuration, the durability and strength and the steering force transmission efficiency of the rack tooth 230 can be maintained to the sufficient level without reducing the area of the contact face 233 with the pinion gear 13a largely.

Thus, as has been described heretofore, according to the invention, the rack bar can have the sufficient steering force transmission efficiency as well as the sufficient durability and strength, and the life of the rack bar forming tooth die can be extended.

While the present invention has been described with reference to a certain exemplary embodiment thereof, the scope of the present invention is not limited to the exemplary embodiments described above, and it will be understood by those skilled in the art that various changes and modifications may be made therein without departing from the scope of the present invention as defined by the appended claims.

What is claimed is:

1. A teeth forming die configured to form rack teeth of a rack bar to be meshed with a pinion gear, the teeth forming die comprising a securing portion configured to be secured to an outside clamp case, and a rack teeth transfer portion provided on the securing portion,
    wherein the rack teeth transfer portion comprises a plurality of rack tooth transfer portions provided side by side in a line,
    wherein each of the rack tooth transfer portions is configured to transfer a profile of each rack tooth, each of the rack tooth transfer portions comprising a tooth bottom transfer portion configured to transfer a profile of a tooth bottom portion of the rack tooth, a tooth tip transfer portion configured to transfer a profile of a tooth tip portion of the rack tooth, a contact face transfer portion arranged obliquely relative to a direction of the line in which the rack tooth transfer portions are provided side by side and configured to transfer a profile of a contact face of the rack tooth to be brought into contact with the pinion gear, and a rounded corner portion between the tooth tip transfer portion and the contact face transfer portion,
    wherein a first radius defining a central area of the rounded corner portion with respect to a tooth width direction is larger than a second radius defining another area of the rounded corner portion other than the central area.

2. The teeth forming die according to claim 1, wherein at least one of the first radius and the second radius is different for each of the rack tooth transfer portions.

* * * * *